United States Patent [19]

Ravichandran

[11] Patent Number: 4,696,964

[45] Date of Patent: Sep. 29, 1987

[54] COMPOSITIONS STABILIZED WITH ETHERS OF DI- AND TRI-SUBSTITUTED HYDROXYLAMINES

[75] Inventor: Ramanathan Ravichandran, Yonkers, N.Y.

[73] Assignee: Ciba-Geigy Corporation, Ardsley, N.Y.

[21] Appl. No.: 850,810

[22] Filed: Apr. 11, 1986

[51] Int. Cl.[4] .................. C07C 93/12; C07C 93/08; C07C 93/02; C08K 5/32
[52] U.S. Cl. ........................ 524/236; 252/51.5 R; 564/300; 564/301
[58] Field of Search ............ 564/300, 301; 524/236; 252/392, 51.5 R

[56] References Cited

U.S. PATENT DOCUMENTS

| | | | |
|---|---|---|---|
| 3,207,787 | 9/1965 | Levy | 564/300 |
| 3,316,299 | 4/1967 | Paquette | 564/301 |
| 3,344,190 | 9/1967 | Nicolaus et al. | 564/301 |
| 3,432,578 | 3/1969 | Martin | 564/300 |
| 3,714,199 | 1/1973 | McDowell et al. | 564/301 |
| 3,867,445 | 2/1975 | Klemchuk | 564/301 |
| 3,869,278 | 3/1975 | Wilcox | 564/301 |
| 4,350,606 | 9/1982 | Cuisia et al. | 564/300 |
| 4,581,429 | 4/1986 | Solomon et al. | 564/301 |
| 4,612,393 | 9/1986 | Ravichandran et al. | 564/301 |

FOREIGN PATENT DOCUMENTS 58-193377 11/1983 Japan .

OTHER PUBLICATIONS

CA 100, 196545g (1984).
Weiss, Randy H., J. Org. Chem., 49, 4969-4972 (1984).

Primary Examiner—Veronica P. Hoke
Attorney, Agent, or Firm—Harry Falber

[57] ABSTRACT

Various di- and tri-substituted hydroxylamine derivatives are effective in stabilizing organic materials against oxidative, thermal and actinic degradation, said derivatives being particularly effective as color improvers and process stabilizers in organic materials containing phenolic antioxidants and/or metal salts of fatty acids and/or hindered amine light stabilizers and/or organic phosphorus compounds; and certain of said derivatives as new compounds.

32 Claims, No Drawings

COMPOSITIONS STABILIZED WITH ETHERS OF DI- AND TRI-SUBSTITUTED HYDROXYLAMINES

Organic polymeric materials such as plastics and resins are subject to thermal, oxidative and photodegradation. A great variety of stabilizers are known in the art for stabilizing a diversity of substrates. Their effectiveness varies depending upon the causes of degradation and the substrate stabilized. In general, it is difficult to predict which stabilizer will be most effective and most economical for any one area of application. For example, stabilizer effectiveness in reducing volatility may depend upon preventing bond scission in the substrate molecule. Limiting embrittlement and retaining elasticity in a polymer or rubber may require prevention of excessive crosslinking and/or chain scission. Prevention of discoloration may require inhibiting reactions which yield new chromophores or color bodies in the substrate or stabilizer. Problems of process stability and incompatibility must also be considered.

Various organic hydroxylamine compounds are generally known and some are commercially available. A number of patents disclose nitrogen-substituted hydroxylamines as antioxidant stabilizers for various substrates including polyolefins, polyesters and polyurethanes. U.S. Pat. Nos. 3,432,578, 3,644,278, 3,778,464, 3,408,422, 3,926,909, 4,316,996 and 4,386,224 are representative of such patents which basically disclose N,N-dialkyl-, N,N-diaryl and N,N-diaralkyl hydroxylamine compounds and their color improvement and color stabilizing activity.

In addition, various N,N,O-trisubstituted and N,O-disubstituted hydroxylamines are disclosed in the literature. For example, U.S. Pat. No. 3,184,500 describes R$_2$NOCH$_2$CH$_2$OAcyl wherein R is lower alkyl groups such as methyl; U.S. Pat. No. 3,344,190 describes R$_2$NOCH$_2$CH$_2$OH wherein R is a lower alkyl radical; U.S. Pat. No. 3,869,278 describes (R)$_2$NOR$_1$ wherein R is alkyl and R$_1$ is alkyl and phenyl among others, as fruit abscission agents; German 1,237,129 describes the preparation of N,N,O-trisubstituted hydroxylamines by UV irradiation of amine oxides; Leo A. Paquette [J. Org. Chem., 29, 3545 (1964)] describes the preparation of R$_2$NCH$_2$CH$_2$ONH$_2$ wherein R$_2$N=heptamethyleneimino, morpholino, pyrrolidino, phenothiazin-10-yl and 5-dibenzazepinyl; E. I. Schumann et al [J. Med. Chem. 7,329 (1964)] describe the preparation of several O-aralkylhydroxylamines useful as 5-hydroxytryptophon decarboxylase inhibitors and mild depressants; A. T. Fuller [J. C. S. pt. 2, 963 (1947)] reports the preparation of a series of O-alkyl and O-O'-alkylenehydroxylamines (from hydroxyurethane) with potential antibacterial activity; Bernhart [Tet. Lett. 29, 2493 (1974)] describes the preparation of a series of N,O-dialkylhydroxylamines by the reduction of O-alkylbenzaldoximes; B. V. Tronov et al [CA 66, 37339f (1967)] describe the preparation and properties of N-alkoxydiethylamines; O-alkylation of diethylhydroxylamine is described by E. Flesia et al [Tet. Lett. 197 (1979)]. I. M. Bortori et al [CA 73, 55743g (1969)] describe the synthesis and study of the antibacterial properties of N-(aryloxy)diethylamines; F. Klages [Ber. 96, 2387-93 (1963)] describes the preparation of (PhCH$_2$)$_2$ NOEt and (tert-Bu)$_2$NOCH$_2$Ph; and Japan 69 25772 [CA 72, 78685h (1970)] describes the preparation of (R')(OR)NCH$_2$CH$_2$CO(C$_6$H$_4$X) useful as antiinflammatory drugs. It is to be noted that these various compounds are all indicated for pharmaceutical or agricultural use.

It has now been determined that the compositions of this invention exhibit a variety of desirable properties stemming from the presence therein of the indicated hydroxylamine derivatives. Thus, the compounds serve to protect various substrates such as polyolefins, elastomers and lubricating oils against the adverse effects of oxidative and thermal degradation. They are most effective as color improvers and process stabilizers in polyolefin compositions which may contain metal salts of fatty acids and which also contain a phenolic antioxidant. Thus, they serve to substantially reduce color formation resulting from the presence of the phenolic antioxidant and/or from the processing conditions as well as to directly protect the polymer from said processing conditions. They also prevent the discoloration of polyolefin compositions containing hindered amine light stabilizers or combinations of phenolic antioxidants and organic phosphites. In addition, the gas fading that may be experienced upon exposure to the combustion products of natural gas is also significantly reduced.

It is a primary object of this invention to provide compositions of organic materials stabilized against oxidative, thermal and actinic degradation by the presence therein of a class of di- or tri-substituted hydroxylamine derivatives.

It is a further object to provide such compositions which also contain phenolic antioxidants wherein said hydroxylamine derivatives substantially reduce color formation resulting from the presence of said phenol.

It is still a further object to provide a specific class of novel hydroxylamine derivatives which likewise exhibits a broad range of improved stabilization performance characteristics.

Various other objects and advantages of this invention will become evident from the following description thereof.

The stabilizing compounds utilized in the compositions of this invention include α,α'-Bis(benzyloxyamino)-p-xylene as well as those compounds which correspond to the formula I

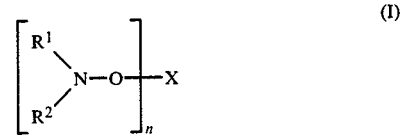

wherein

R$^1$ is hydrogen, alkyl of 1 to 36 carbon atoms, cycloalkyl of 5 to 12 carbon atoms, aralkyl of 7 to 9 carbon atoms or said aralkyl substituted by alkyl of 1 to 36 carbon atoms;

R$^2$ is alkyl of 1 to 36 carbon atoms, cycloalkyl of 5 to 12 carbon atoms, aralkyl of 7 to 9 carbon atoms or said aralkyl substituted by alkyl of 1 to 36 carbon atoms;

n is 1–4;

X, when n is 1, is the same as R$^2$;

X, when n is 2, is alkylene of 2 to 12 carbon atoms, cycloalkylene of 6 to 10 carbon atoms or alkylenearylenealkylene of 8 to 10 carbon atoms;

X, when n is 3, is alkanetriyl of 3 to 6 carbon atoms or

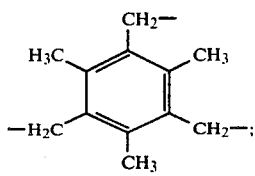

and

X, when n is 4, is alkanetetrayl of 4 to 6 carbon atoms.

The $R^1$ and $R^2$ groups are preferably hydrogen (for $R^1$), or branched alkyl with 1 to 18 carbon atoms such as methyl, ethyl, butyl, 2-ethylhexyl, octyl, decyl, dodecyl and octadecyl; cyclopentyl and cyclohexyl; and benzyl, α-methylbenzyl and α,α-dimethylbenzyl. $R^1$ and $R^2$ as benzyl are especially preferred.

X, when n=1, is preferably similar to the list of preferred $R^1$ and $R^2$ substituents.

X, when n=2, is preferably alkylene of 2 to 12 carbon atoms, including ethylene, hexylene and octylene; cyclohexylene; and xylylene.

X, when n=3, is preferably 2,4,6-trimethylmesityl.

X, when n=4, is preferably pentaerythrityl.

The primary method for preparing the derivatives involves reacting the appropriately substituted alkoxyamine hydrochloride with an appropriately substituted bromide (provides the N- or N,N-substitution) in a solvent to yield the desired product. The solvent can be an aromatic hydrocarbon such as benzene, toluene, xylene, and the like, a heterocyclic ether such as tetrahydrofuran, or preferably a solvent such as dimethylformamide. The reaction temperature ranges from 25° to 150° C. It is preferred in this reaction approach to conduct the reaction in the presence of an acid acceptor such as sodium carbonate. Th starting materials are items of commerce or can be prepared by known methods.

In those situations where N,O-dialkylated hydroxylamine is the desired end product, it is preferably to conduct the process by reacting the (O-substituted)($R^1$)($R^2$)aldoxime in the presence of an alcoholic solvent such as methanol, and a hydride reducing agent such as sodium cyanoborohydride, at acidic pH. The reaction temperature generally ranges from 25° to 85° C. The reactants in this approach are also commercially available or can be prepared by known methods.

Furthermore, in those instances where difunctional N,N,O-trialkylated hydroxylamine is desired, a multistep approach is also available. This approach involves a first step of reacting N-hydroxyurethane and a dibromo compound (Br—X—Br) in an alcoholic solvent in the presence of an acid acceptor such as an alkali metal hydroxide. The reaction is conducted at a temperature of from 25° to 100° C. and preferably at the reflux temperature. The appropriate dioxydiurethane resulting from the first step is then heated at reflux in an aqueous solution of a base such as an alkali metal hydroxide, to prepare the corresponding dioxydiamine. Finally, the diamine is dissolved in a solvent such as dimethylformamide, admixed with an acid acceptor such as anhydrous sodium carbonate, and slowly mixed with the appropriately substituted bromide, i.e. the substituent on the bromide being the N-substituent or substituents in the final product. The reaction proceeds at 25° to 80° C., preferably room temperature, to produce the desired hydroxylamine end product. The reactants in this approach are likewise, items of commerce or can be prepared by known methods.

In each instance, the resulting hydroxylamines are either di- or tri-substituted, i.e. N,O-disubstituted or N,N-O-trisubstituted.

The compounds utilized in the present invention are particularly effective in stabilizing organic materials subject to oxidative, thermal and actinic degradation, such as plastics, polymers and resins.

Substrates in which these compounds are particularly useful are polyolefins such as polyethylene and polypropylene; polystyrene, including impact polystyrene, ABS resin, SBR, isoprene, as well as natural rubber, polyesters including polyethylene terephthalate and polybutylene terephthalate, including copolymers, and lubricating oils such as those derived from mineral oil.

In general polymers which can be stabilized include
1. Polymers of monoolefins and diolefins, for example polyethylene (which optionally can be crosslinked), polypropylene, polyisobutylene, polybutene-1, polymethylpentene-1, polyisoprene or polybutadiene, as well as polymers of cycloolefins, for instance of cyclopentene or norbornene.
2. Mixtures of the polymers mentioned under (1), for example mixtures of polypropylene with polyisobutylene.
3. Copolymers of monoolefins and diolefins with each other or with other vinyl monomers, such as, for example, ethylene/propylene, propylene/butene-1, propylene/isobutylene, ethylene/butene-1, propylene/butadiene, isobutylene/isoprene, ethylene/alkyl acrylates, ethylene/alkyl methacrylates, ethylene/vinyl acetate or ethylene/acrylic acid copolymers and their salts (ionomers) and terpolymers of ethylene with propylene and a diene, such as hexadiene, dicyclopentadiene or ethylidene-norbornene.
4. Polystyrene, poly-(p-methylstyrene).
5. Copolymers of styrene or methylstyrene with dienes or acrylic derivatives, such as, for example, styrene/butadiene, styrene/acrylonitrile, styrene/ethyl methacrylate, styrene/butandiene/ethyl acrylate, styrene/acrylonitrile/methyl acrylate; mixtures of high impact strength from styrene copolymers and another polymer, such as, for example, from a polyacrylate, a diene polymer or an ethylene/propylene/diene terpolymer; and block polymers of styrene, such as, for example, styrene/butadiene/styrene, styrene/isoprene/styrene, styrene/ethylene/butylene/styrene or styrene/ethylene/propylene/styrene.
6. Graft copolymers of styrene, such as, for example, styrene on polybutadiene, styrene and acrylonitrile on polybutandiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures thereof with the copolymers listed under (5), for instance the copolymer mixtures known as ABS-, MBS-, ASA- or AES-polymers.
7. Halogen-containing polymers, such as polychloroprene, chlorinated rubbers, chlorinated or sulfochlorinated polyethylene, epichlorohydrine homo- and copolymers, polymers from halogen-containing vinyl compounds, as for example, polyvinylchloride, polyvinylidene chloride, polyvinyl fluoride, polyvinylidene fluoride, as well as copolymers thereof, as for example, vinyl chloride/vinylidene chloride, vinyl chloride/vinyl acetate or vinylidene chloride/vinyl acetate copolymers.
8. Polymers which are derived from α,β-unsaturated acids and derivatives thereof, such as polyacrylates and polymethacrylates, polyacrylamide and polyacrylonitrile.
9. Copolymers from the monomers mentioned under (8) with each other or with other unsaturated monomers, such as, for instance, acrylonitrile/butadien, acrylonitrile/alkyl acrylate, acrylonitrile/alkoxyalkyl acrylate or acrylonitrile/vinyl halogenide copolymers or acrylonitrile/alkyl methacrylate/butadiene terpolymers.
10. Polymers which are derived from unsaturated alcohols and amines, or acyl derivatives thereof or acetals thereof, such as polyvinyl alcohol, polyvinyl acetate, polyvinyl stearate, polyvinyl benzoate, polyvinyl maleate, polyvinylbutyral, polyallyl phthalate or polyallyl-melamine.
11. Homopolymers and copolymers of cyclic ethers, such as polyalkylene glycols, polyethylene oxide, polypropylene oxide or copolymers thereof with bis-glycidyl ethers.
12. Polyacetals, such as polyoxymethylene and those polyoxymethylenes which contain ethylene oxide as comonomer.
13. Polyphenylene oxides and sulfides, and mixtures of polyphenylene oxides with polystyrene.
14. Polyurethanes which are derived from polyethers, polyesters or polybutadiens with terminal hydroxyl groups on the one side and aliphatic or aromatic polyisocyanates on the other side, as well as precursors thereof (polyisocyanates, polyols or prepolymers).
15. Polyamides and copolyamides which are derived from diamines and dicarboxylic acids and/or from aminocarboxylic acids or the corresponding lactams, such as polyamide 4, polyamide 6, polyamide 6/6, polyamide 6/10, polyamide 11, polyamide 12, poly-2,4,4-trimethylhexamethylene terephthalamid or poly-m-phenylene isophthalamide, as well as copolymers thereof with polyethers, such as for instance with polyethylene glycol, polypropylene glycol or polytetramethylene glycols.
16. Polyureas, polyimides and polyamide-imides.
17. Polyesters which are derived from dicarboxylic acids and diols and/or from hydroxycarboxylic acids or the corresponding lactones, such as polyethylene terephthalate, polybutylene terephthalate, poly-1,4-dimethylol-cyclohexane terephthalate, poly-[2,2-(4-hydroxyphenyl)-propane]terephthalate and polyhydroxybenzoates as well as block-copolyether-esters derived from polyethers having hydroxyl end groups.
18. Polycarbonates.
19. Polysulfones, polyethersulfones and polyetherketones.
20. Crosslinked polymers which are derived from aldehydes on the one hand and phenols, ureas and melamines on the other hand, such as phenol/formaldehyde resins, urea/formaldehyde resins and melamine/formaldehyde resins.
21. Drying and non-drying alkyd resins.
22. Unsaturated polyester resins which are derived from copolyesters of saturated and unsaturated dicarboxylic acids with polyhydric alcohols and vinyl compounds as crosslinking agents, and also halogen-containing modifications thereof of low inflammability.
23. Thermosetting acrylic resins, derived from substituted acrylic esters, such as epoxy-acrylates, urethane-acrylates or polyester acrylates.
24. Alkyd resins, polyester resins or acrylate resins in admixture with melamine resins, urea resins, polyisocyanates or epoxide resins as crosslinking agents.
25. Crosslinked epoxide resins which are derived from polyepoxides, for example from bis-glycidyl ethers or from cycloaliphatic diepoxides.
26. Natural polymers, such as cellulose, rubber, gelatine and derivatives thereof which are chemically modified in a polymerhomologous manner, such as cellulose acetates, cellulose propionates and cellulose butyrates, or the cellulose ethers, such as methylcellulose.
27. Mixtures of polymers as mentioned above, for example PP/EPDM, Polyamide 6/EPDM or ABS, PVC/EVA, PVC/ABS, PVC/MBS, PC/ABS, PBTP/ABS.
28. Naturally occuring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, which materials may be used as plasticizers for polymers or as textile spinning oils, as well as aqueous emulsions of such materials.
29. Aqueous emulsions of natural or synthetic rubber, e.g. natural latex or latices of carboxylated styrene/butadiene copolymers.

In general, the compounds of the present invention are employed in from about 0.01 to about 5% by weight of the stabilized composition, although this will vary with the particular substrate and application. An advantageous range is from about 0.5 to about 2%, and especially 0.1 to about 1%.

The stabilizers of the instant invention may readily be incorporated into the organic polymers by conventional techniques, at any convenient stage prior to the manufacture of shaped articles therefrom. For example, the stabilizer may be mixed with the polymer in dry powder form, or a suspension or emulsion of the stabilizer may be mixed with a solution, suspension, or emulsion of the polymer. The resulting stabilized polymer compositions of the invention may optionally also contain various conventional additives, such as the following.

1. ANTIOXIDANTS

1.1. Alkylated monophenols, for example, 2,6-di-tert.butyl-4-methylphenol
2-tert.butyl-4,6-dimethylphenol
2,6-di-tert.butyl-4-ethylphenol
2,6-di-tert.butyl-4-n-butylphenol
2,6-di-tert.butyl-4-i-butylphenol
2,6-di-cyclopentyl-4-methylphenol
2-(α-methylcyclohexy)-4,6-dimethylphenol
2,6-di-octadecyl-4-methylphenol
2,4,6-tri-cyclohexylphenol
2,6-di-tert.butyl-4-methoxymethylphenol

1.2. Alkylated hydroquinones, for example, 2,6-di-tert.butyl-4-methoxyphenol
2,5-di-tert.butyl-hydroquinone 2,5-di-tert.amyl-hydroquinone
2,6-diphenyl-4-octadecyloxyphenol 1.3. Hydroxylated thiodiphenyl ethers, for example 2,2'-thio-bis-(6-tert.butyl-4-methylphenol)
2,2'-thio-bis-(4-octylphenol)
4,4'-thio-bis-(6-tert.butyl-3-methylphenol)
4,4'-thio-bis-(6-tert.butyl-2-methylphenol)

1.4. Alkyliden-bisphenols, for example, 2,2'-methylene-bis-(6-tert.butyl-4-methylphenol)
2,2'-methylene-bis-(6-tert.butyl-4-ethylphenol)
2,2'-methylene-bis[4-methyl-6-(α-methylcyclohexyl)-phenol]
2,2'-methylene-bis-(4-methyl-6-cyclohexylphenol)
2,2'-methylene-bis-(6-nonyl-4-methylphenol)
2,2'-methylene-bis-[6-(α-methylbenzyl)-4-nonylphenol]
2,2'-methylene-bis-[6-(α,α-dimethylbenzyl)-4-nonpl-phenol]
2,2'-methylene-bis-(4,6-di-tert.butylphenol)
2,2'-ethylidene-bis-(4,6-di-tert.butylphenol)
2,2'-ethylidene-bis-(6-tert.butyl-4-isobutylphenol)
4,4'-methylene-bis-(2,6-di-tert.butylphenol)
4,4'-methylene-bis-(6-tert.butyl-2-methylphenol)
1,1-bis-(5-tert.butyl-4-hydroxy-2-methylphenyl-butane
2,6-di-(3-tert.butyl-5-methyl-2-hyroxybenzyl)-4-methylphenol
1,1,3-tris-(5-tert.butyl-4-hydroxy-2-methylphenyl)-butane
1,1-bis-(5-tert.butyl-4-hydroxy-2-methylphenyl)-3-n-dodecylmercaptobutane
ethylenglycol-bis-[3,3-bis-(3'-tert.butyl-4'-hydroxyphenyl)-butyrate]
di-(3-tert.butyl-4-hydroxy-5-methylphenyl)-dicyclopentadiene
di-[2-(3'-tert.butyl-2'-hydroxy-5'-methyl-benzyl)-6-tert.butyl-4-methylphenyl]-terephthalate.

1.5. Benzyl compounds, for example, 1,3,5-tri-(3,5-di-tert.butyl-4-hydroxybenzyl)-2,4,6-trimethylbenzene-di-(3,5-di-tert.butyl-4-hydroxybenzyl)sulfide
3,5-di-tert.butyl-4-hydroxybenzyl-mercapto-acetic acid isooctyl ester
bis-(4-tert.butyl-3-hydroxy-2,6-dimethylbenzyl)dithioloterephthalate
1,3,5-tris-(3,5-di-tert.butyl-4-hydroxybenzyl)-isocyanurate
1,3,5-tris-(4-tert.butyl-3-hydroxy-2,6-dimethylbenzyl)isocyanurate
3,5-di-tert.butyl-4-hydroxybenzyl-phosphoric acid-dioctadecyl ester
3,5-di-tert.butyl-4-hydroxybenzyl-phosphoric acid-monoethyl ester, calcium-salt 1.6. Acylaminophenols, for example, 4-hydroxy-lauric acid anilide
4-hydroxy-stearic acid anilide
2,4-bis-octylmercapto-6-(3,5-tert.butyl-4-hydroxyanilino)-s-triazine
octyl-N-(3,5-di-tert.butyl-4-hydroxyphenyl)-carbaminate 1.7. Esters of
β-(3,5-di-tert.butyl-4-hydroxyphenyl)propionic acid with monohydric or polyhydric alcohols, for example, methanol
octadecanol
1,6-hexanediol
neopentylglycol
thiodiethyleneglycol
diethyleneglycol
triethyleneglycol
pentaerylthritol
tris-hydroxyethyl isocyanurate
di-hydroxyethyl oxalic acid diamide 1.8. Esters of
β-(5-tert.butyl-4-hydroxy-3-methylphenyl)propionic acid with monohydric or polyhydric alcohols, for example, methanol
octadecanol
1,6-hexanediol
neopentylglycol
thiodiethyleneglycol
diethyleneglycol
triethyleneglycol
pentaerytritol
tris-hydroxyethyl isocyanurate
di-hydroxyethyl oxalic acid diamide 1.9. Amides of
β-(3,5-di-tert.butyl-4-hydroxyphenyl)propionic acid for example, N,N'-di-(3,5-di-tert.butyl-4-hydroxyphenylpropionyl)-hexamethylendiamine
N,N'-di-(3,5-di-tert.butyl-4-hydroxyphenylpropionyl)-trimethylenediamine
N,N'-di-(3,5-di-tert.butyl-4-hydroxyphenylpropionyl)-hydrazine

2. UV ABSORBERS AND LIGHT STABILISERS 2.1. 2-(2'-Hydroxyphenyl)-benztriazoles, for example, the 5'-methyl-, 3',5'-di-tert.butyl-, 5'-tert.butyl-, 5'-(1,1,3,3-tertramethylbutyl)-, 5-chloro-3',5'-di-tert.butyl, 5-chloro-3'-tert.butyl-5'-methyl-, 3'-sec.butyl-5'tert.-butyl-, 4'-octoxy, 3',5'-di-tert.amyl-, 3',5'-bis(α,α-dimethylbenzyl)-derivative.

2.2. 2-Hydroxy-benzophenones, for example, the 4-hydroxy-, 4methoxy-, 4-octoxy, 4-decyloxy-, 4-dodecyloxy-, 4-benzyloxy, 4,2',4'-trihydroxy- and 2'-hydroxy-4,4'-dimethoxy derivative.

2.3. Ester of optionally substituted benzoic acids for example, phenyl salicylate, 4-tert.butyl-phenylsalicilate, octylphenyl salicylate, dibenzoylresorcinol, bis-(4-tert.butylbenzoyl)-resorcinol, benzoylresorcinol, 3,5-di-tert.butyl-4-hydroxybenzoic acid 2,4-di-tert.butyl-phenyl ester and 3,5-di-tert.-butyl-4-hydroxybenzoic acid hexadecyl ester.

2.4. Acrylates, for example,

α-cyano-β,β-diphenylacrylic acid ethyl ester or iso-octyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline. 2.5 Nickel compounds, for example, nickel complexes of 2,2'-thio-bis-[4-(1,1,3,3-tetramethylbutyl)-phenol], such as the 1:1 or 1:2 complex, optionally with additional ligands such as n-butylamine, triethanolamine or N-cyclohexyl-di-ethanolamine, nickel dibutyldithiocarbamate, nickel salts of 4-hydroxy-3,5-di-tert.butylbenzylphosphonic acid monoalkyl esters, such as of the methyl, ethyl or butyl ester, nickel complexes of ketoximes such as of 2-hydroxy-4-methyl-phenyl undecyl ketoxime, nickel complexes of 1-phenyl-4-lauroyl-5-hydroxy-pyrazol, optionally with additional ligands.

2.6. Sterically hindered amines, for example bis-(2,2,6,6-tetramethylpiperidyl)-sebacate bis-(1,2,2,6,6-pentamethylpiperidyl)-sebacate n-butyl-3,5-di-tert.butyl-4-hydroxybenzyl malonic acid bis-(1,2,2,6,6-pentamethylpiperidyl)ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylendiamine and 4-tert.octylamino-2,6-dichloro-1,3,5-s-triazine, tris(2,2,6,6-tetramethylpiperidyl)-nitrilotriacetate, tetrakis-(2,2,6,6-tetramethyl-4-piperidyl)-1,2,3,4-butanetetracarbonic acid, 1,1'(1,2-ethanediyl)-bis-(3,3,5,5-tetramethylpiperazinone).

2.7. Oxalic acid diamides, for example, 4,4'-di-octyloxyoxanilide, 2,2'-di-octyloxy-5,5'-di-tert.butyl-oxanilide, 2,2'-di-dodecyloxy-5,5'-di-tert.butyl-oxanilide, 2-ethoxy2'-ethyl-oxanilide, N,N'-bis(3-dimethylaminopropyl)oxalamide, 2-ethoxy-5-tert.butyl-2'-ethyloxanilide and its mixture with 2-ethoxy-2'-ethyl-5,4'-di-tert.butyloxanilide and mixtures of ortho- and para-methoxy-as well as of o- and p-ethoxy-disubstituted oxanilides.

3. Metal deactivators, for example,

N,N'-diphenyloxalic acid diamide, N-salicylal-N'-salicyloylhydrazine, N,N'-bis-salicyloylhydrazine, N,N'-bis-(3,5-di-tert.butyl-4-hydroxyphenylpropionyl)-hydrazine, 3-salicyloylamino-1,2,4-triazole, bis-benzylidene-oxalic acid dihydrazide.

4. Phosphites and phosphonites, for example, triphenyl phosphite, diphenylalkyl phosphites, phenyldialkyl phosphites, tri-(nonylphenyl)phosphite, trilauryl phosphite, trioctadecyl phosphite, di-stearyl-pentaerythritol diphosphite, tris-(2,4-di-tert.butylphenyl)-phosphite, di-isodecylpentaerythritol diphosphite, di-(2,4-di-tert.butylphenyl)pentaerythritol diphosphite, tristearyl-sorbitol triphosphite, tetrakis-(2,4-di-tert.butylphenyl)-4,4'-diphenylylenediphosphonite.

5. Compounds which destroy peroxide, for example, esters of β-thiodipropionic acid, for example the lauryl, stearyl, myristyl or tridecyl esters, mercapto-benzimidazole or the zinc salt of 2-mercaptobenzimidazole, zinc-dibutyl-dithiocarbamate, dioctadecyldisulfide, pentaerythritol-tetrakis(β-dodecylmercapto)-propionate.

6. Polyamide stabilisers, for example copper salts in combination with iodides and/or phosphorus compounds and salts of divalent manganese.

7. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example Ca stearate, Zn stearate, Mg stearate, Na ricinoleate and K palmitate, antimony pyrocatecholate or zinc pyrocatecholate.

8. Nucleating agents, for example, 4-tert.butyl-benzoic acid, adipic acid, diphenylacetic acid.

9. Fillers and reinforcing agents, for example, calcium carbonate, silicates, glass fibres, asbestos, talc, kaolin, mica, barium sulfate, metal oxides and hydroxides, carbon black, graphite.

10. Other additives, for example, plasticizers, lubricants, emulsifiers, pigments, optical brighteners, flameproofing agents, anti-static agents, blowing agents and thiosynergists such as dilaurylthiodipropionate or distearylthiodipropionate.

While the instant hydroxylamines can be beneficially used as stabilizers for a variety of substrates, particularly the polyolefins, both alone and in conjunction with other coadditives, the introduction of the instant hydroxylamines into various compositions, particularly polyolefins, optionally containing various alkali metal, alkaline earth metal and aluminum salts of higher fatty acids (see Additive #7 hereinabove), with hindered phenolic antioxidants exhibits enhanced and particularly salubrious protection to such substrates in terms of reducing color formation stemming from the presence of the phenols. Such phenolic antioxidants include n-octadecyl 3,5-di-tert-butyl-4-hydroxyhydrocinnamate, neopentanetetrayl tetrakis-(3,5-di-tert-butyl-4-hydroxyl-hydrocinnamate), di-n-octadecyl 3,5-di-tert-butyl-4-hydroxybenzylphosphonate, 1,3,5-tris(3,5-di-tert-butyl-4-hydroxybenzyl)isocyanurate, thiodiethylene bis(3,5-di-tert-butyl-4-hydroxyhydrocinnamate), 1,3,5-trimethyl-2,4,6-tris(3,5-di-tert-butyl-4-hydroxybenzyl)benzene, 3,6-di-oxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-di-methyl-4-tert-butyl-3-hydroxybenzyl-)isocyanurate, 1,1,3-tris-(2-methyl-4-hydroxy-5-tert-butylphenyl)butane, 1,3,5-tris-[2-(3,5-di-tert-butyl-4-hydroxyhydrocinnamoyloxy)-ethyl]-isocyanurate, 3,5-di-(3,5-di-tert-butyl-4-hydroxybenzyl)-mesitol, hexamethylene bis(3,5-di-tert-butyl-4-hydroxyhydrocinnamate), 1-(3,5-di-tert-butyl-4-hydroxyanilino)-3,5-di(octylthio)-s-triazine, N,N'-hexamethylene-bis(3,5-di-tert-butyl-4-hydroxyhydrocinnamamide), calcium bis(ethyl 3,5-di-tert-butyl-4-hydroxybenzylphosphonate), ethylene bis[3,3-di(3-tert-butyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)-hydrazide, and N,N'-bis[2-(3,5-tert-butyl-4-hydroxyhydroxo-cinnamoyloxy)ethyl]-oxamide, and preferably neopentanetetrayl tetrakis(3,5-di-tert-butyl-4-hydroxyhydrocinnamate), n-octadecyl 3,5-di-tert-butyl-4-hydroxyhydrocinnamate, 1,3,5-trimethyl-2,4,6-tris(3,5-di-tert-butyl-4-hydroxybenzyl)benzene, 1,3,5-tris-(3,5-di-tert-butyl-4-hydroxybenzyl)isocyanurate, 2,6-di-tert-butyl-p-cresol or 2,2'-ethylidene-bis(4,6-di-tert-butylphenol).

Likewise, the instant compounds prevent color formation when hindered amine light stabilizers are present, such hindered amines including bis(1,2,2,6,6-pentamethyl-4-piperidyl)-2-n-butyl-2-(3,5-di-tert-butyl-4-hydroxybenzyl)malonate; bis(2,2,6,6-tetramethyl-4-piperidyl)sebacate; dimethylsuccinate polymer with 4-hydroxy-2,2,6,6-tetramethyl-1-piperidinethanol; and polymer of 2,4-dichloro-6-octylamino-s-triazine with N'-(2,2,6,6-tetramethyl-4-piperidyl)hexamethylene diamine.

As previously noted, certain hydroxylamine derivatives also form part of the instant invention. These derivatives correspond to formula I wherein n is 2–4 (labelled m for these compounds). The various substituent definitions, preferred substituents, preparative procedures and utility statements noted hereinabove equally apply to these novel hydroxylamine derivatives.

The following examples illustrate the embodiments of this invention. Thus, they describe the preparation of various hydroxylamine derivatives, including those forming part of the invention, and of stabilized compositions. In these examples, all parts given are by weight unless otherwise specified.

EXAMPLE I

O-Methyl-N,N-dibenzylhydroxylamine

A mixture of 5.11 g of methoxylaminehydrochloride, 20.87 g of benzylbromide and 25.8 g of sodium carbonate in 50 ml of dimethylformamide is heated at 85° C. for 4 hrs. The reaction mixture is treated with ether and water. The organic phase is separated and washed with water, dried (MgSO$_4$) and evaporated under reduced pressure. Flash column chromatography of the residue affords the title compound as a clear colorless oil.

Anal. calcd. for $C_{15}H_{17}NO$: C, 79.3; H, 7.5; N, 6.2. Found: C, 79.5; H, 7.6; N, 6.1

EXAMPLE II

N,N,O-tribenzylhydroxylamine

A mixture of 13.04 g of benzyloxyaminehydrochloride, 20.0 ml of benzylbromide, and 32.0 g of sodium carbonate in 85 ml of dimethylformamide is stirred at room temperature for four days. The reaction mixture is worked up as in Example I and the crude product is distilled under reduced pressure to afford the title compound as a clear colorless liquid.

Anal. calcd. for $C_{21}H_{21}NO$: C, 83.1; H, 7.0; N, 4.6. Found: C, 82.7; H, 7.0; N, 4.9

EXAMPLE III

N,N,O-Tris[m-methylbenzyl]hydroxylamine

A mixture of 17.37 g of hydroxylamine hydrochloride and 105.9 g of sodium carbonate in 450 ml of dimethylformamide (DMF) is stirred at room temperature for 30 min. A solution of 92.5 g m-methylbenzylbromide is 50 ml of dimethylformamide is then added over a period of 15 min. After stirring the mixture at room temperature for 12 hours, the inorganics are removed by filtration and DMF is removed under reduced pressure to leave an oily solid. The ether soluble portion of this oily solid is distilled under reduced pressure to afford the title compound as a pale yellow oil.

Anal. calcd. for $C_{24}H_{27}NO$: C, 83.4; H, 7.9; N, 4.1. Found: C, 83.1; H, 7.9; N, 4.2

EXAMPLE IV

N-Dodecyl-O-benzylhydroxylamine

A mixture of 11.55 g of benzyloxyamine hydrochloride, 31.0 g of sodium carbonate and 34.8 ml of dodecylbromide in 100 ml of dimethylformamide is heated at 70° C. for 24 hours, and a further 24 hours at 80° C. The solvent is removed under reduced pressure and the residue is partitioned between water and methylene chloride. The organic layer is washed with water, brine, dried (MgSO$_4$) and evaporated to give an oily residue. Liquid chromatography affords the title compound as a thick oil.

Anal. calcd. for $C_{19}H_{33}NO$: C, 78.3; H, 11.4; N, 4.8. Found: C, 78.8; H, 11.6; N, 4.7.

EXAMPLE V

N,N-Didodecyl-O-benzylhydroxylamine

The titled compound is isolated as a byproduct from the liquid chromatography separation mentioned in the preparation of the compound of Example IV.

Anal. Calcd. for $C_{31}H_{57}NO$; C, 81.0; H, 12.5; N, 3.1. Found: C, 81.4; H, 12.8; N, 3.1

EXAMPLE VI

N,O-Dibenzylhydroxylamine

A solution of 25.0 g O-benzylbenzaldoxime in 100 ml of methanol is mixed with 3.0 g of sodium cyanoborohydride and a few mg of methyl orange indicator. Methanolic hydrochloric acid is added to keep the color of the reaction mixture pale pink (pH=3). After stirring at room temperature for 3 hours, 5.0 more grams of sodium cyanoborohydride is added and the reaction mixture (pH=3) is stirred at room temperature for 12 hours. The reaction mixture is alkalified with aqueous sodium hydroxide and then extracted with methylene chloride. The combined organic layer is washed with water, brine, dried (MgSO$_4$) and evaporated to give the crude product. Liquid chromatography affords the title compound as a colorless liquid.

Anal. calcd. for $C_{14}H_{15}NO$: C, 78.8; H, 7.1; N, 6.6 Found: C, 79.4; H, 7.4; N, 6.8

EXAMPLE VII

O-Methyl-N-benzylhydroxylamine

The procedure of Example VI is repeated using 15.0 g of O-methylbenzaldoxime, and 20.0 g of sodium cyanoborohydride in 100 ml of methanol. Bulb to bulb distillation of the crude product affords the title compound as a colorless liquid.

Anal. calcd. for $C_8H_{11}NO$: C, 70.0; H, 8.1; N, 10.2 Found: C, 70.3; H, 8.2; N, 10.0

EXAMPLE VIII

α,α'-Bis[benzyloxyamino]-p-xylene

The procedure of Example VI is repeated using 7.0 g of O,O'-dibenzylterephthaldicarboxaldoxime and 20.0 g of sodium cyanoborohydride in 100 ml of methanol. Liquid chromatography affords the title compound as an oil.

Anal. calcd. for $C_{22}H_{24}N_2O_2$: C, 75.8; H, 6.9; N, 8.1. Found: C, 76.6; H, 6.9; N, 8.2.

EXAMPLE IX 1,8-Bis[N,N-dibenzylaminoxy]octane

A solution of 24.0 g of N-hydroxyurethane, 31.1 g of dibromooctane and 12.8 g of potassium hydroxide in ethanol is heated under reflux for 8 hours. The crude reaction mixture is concentrated under reduced pressure and the residue is dissolved in methylene chloride and washed with water, brine, dried (MgSO$_4$) and evaporated to give 25.0 g of 1,8-octamethylenedioxydiurethane. The crude urethane is heated under reflux with 40 g of potassium hydroxide in 100 ml of water for 8 hours. The product diamine is extracted into methylene chloride and washed with water, brine and dried (MgSO$_4$). Evaporation of the methylene chloride under reduced pressure leaves 18.1 g of the crude 1,8-octamethylenedioxydiamine. To a solution of the crude diamine in 100 ml of DMF is added 44.0 g of anhydrous sodium carbonate followed by dropwise addition of 49.0 ml of benzylbromide. After stirring the reaction mixture at room temperature for 12 hours, the solvent is removed under reduced pressure and the residue is partitioned between methylene chloride and water. The combined organic extract is washed with water, brine, dried (MgSO$_4$) and evaporated to give the crude product. Purification utilizing liquid chromatography affords the product as a waxy white solid; mp 49°–51° C.

Anal. Calcd. for $C_{36}H_{44}N_2O_2$: C, 80.56, H, 8.26: N, 5.22. Found: C, 80.7; H, 8.4, N, 5.2

EXAMPLE X

Processing of Polypropylene

| Base Formulation | |
|---|---|
| Polypropylene* | 100 parts |
| Calcium Stearate | 0.10 part |

*Profax 6501 from Himont U.S.A.

Stabilizers are solvent blended into polypropylene as solutions in methylene chloride and after removal of solvent by evaporation at reduced pressure, the resin is extruded using the following extruder conditions:

| | Temperature (°C.) |
|---|---|
| Cylinder #1 | 232 |
| Cylinder #2 | 246 |
| Cylinder #3 | 260 |
| Gate #1 | 260 |
| Gate #2 | 260 |
| Gate #3 | 260 |
| RPM | 100 |

During extrusion, the internal extruder pressure is determined using a pressure transducer. After each of the first, third and fifth extrusions, resin pellets are compression molded into 125 mil (3.2 mm) thick plaques at 193° C. and specimen yellowness index (Y.I) determined according to ASTM D1925-63T.

The melt flow rate (MFR) is determined by ASTM method 1238 condition L. The melt flow rate varies inversely as the transducer pressure and both are a measure of the molecular weight for a specific type of polymer. The results are shown in the following tables.

| Additives | YI Color After Extrusion | | | MFR After Extrusion (g/10 min.) | |
|---|---|---|---|---|---|
| | 1 | 3 | 5 | 1 | 5 |
| Base | 2.5 | 3.5 | 4.7 | 6.3 | 14.9 |
| 0.1% Antioxidant A | 7.4 | 13.2 | 15.9 | 3.4 | 6.9 |
| 0.1% Antioxidant A + 0.5% Ex. III | 6.2 | 6.9 | 7.5 | 4.2 | 6.5 |
| 0.1% Antioxidant A + 0.05% Ex. IV | 3.2 | 3.4 | 3.6 | 4.5 | 5.7 |
| 0.1% Antioxidant A + 0.05% Ex. V | 4.5 | 4.4 | 4.4 | 3.3 | 3.7 |
| 0.1% Antioxidant A + 0.05% Ex. VI | 1.1 | 0.2 | 3.2 | 3.3 | 5.0 |
| Base | 3.6 | 3.9 | 4.6 | 4.4 | 11.5 |
| 0.1% Antioxidant A | 6.1 | 7.9 | 9.4 | 2.5 | 4.2 |
| 0.1% Antioxidant A + 0.5% Ex. VII | 2.7 | 3.5 | 4.5 | 3.2 | 4.4 |
| 0.1% Antioxidant A + 0.05% Ex. VIII | 4.0 | 5.1 | 5.8 | 3.6 | 5.7 |

| | YI Color After Extrusion | | |
|---|---|---|---|
| | 1 | 3 | 5 |
| Base | 4.6 | 4.3 | 4.4 |
| 0.1% Antioxidant A | 6.3 | 8.8 | 10.0 |
| 0.1% Antioxidant A + 0.05% Ex. I | 5.4 | 7.7 | 7.7 |
| Base | −3.5 | −3.4 | −2.7 |
| 0.1% Antioxidant A | −1.1 | 1.4 | 3.8 |
| 0.1% Antioxidant A + 0.05% Ex. II | −2.6 | −2.6 | −2.2 |
| Base | 4.4 | 6.6 | 8.0 |
| 0.1% Antioxidant A | 7.1 | 11.0 | 12.0 |
| 0.1% Antioxidant A + 0.05% Ex. IX | 7.4 | 9.1 | 8.0 |

Antioxidant A - Neopentyl tetrakis [3-(3',5'-di-tert-butyl-4'-hydroxyphenyl) propanoate]

EXAMPLE XI

Unstabilized polypropylene powder (Hercules Profax 6501) is thoroughly blended with the indicated amount of additive. The blended materials are then milled on a two roll mill at 182° C. for five minutes, after which time the stabilized polypropylene is sheeted from the mill and allowed to cool. The milled polypropylene is then cut into pieces and compression molded on a hydraulic press at 220° C. and 175 psi (1.2×10$^6$ Pa) into 25 mil thick plaques. The sample is exposed in a fluorescent sunlight/black light chamber until failure. Failure is taken as the hours required to reach 0.5 carbonyl absorbance by infrared spectroscopy on the exposed films.

| Additive Compound of | Additive Conc. (% by weight) | FS/BL Test Results (Hours to Failure) |
|---|---|---|
| None | — | 100 |
| Example I | 0.3 | 380 |
| Example II | 0.2 | 230 |
| Example III | 0.2 | 200 |
| Example IV | 0.2 | 310 |
| Example V | 0.2 | 400 |
| Example IX | 0.2 | 250 |

These data thus indicate the effective stabilization activity of the instant compounds.

EXAMPLE XII

Resistance to Gas Fading of Polypropylene Fibers

| Base Formulation | |
|---|---|
| Polypropylene* | 100 parts |
| Calcium Stearate | 0.1 part |
| Antioxidant B | 0.1 part |
| Light Stabilizer C | 0.25 part |

*Profax 6501 from Himont U.S.A.
Antioxidant B - A 1:1 blend of Antioxidant A and tris(2,4-di-tert-butylphenyl)phosphite
Light Stabilizer C - polycondensation product of 2,4-di-chloro-6-tert-octylamino-s-triazine and 4,4'-hexamethylene bis(amino-2,2,6,6-tetramethylpiperidine)

Stabilizers are solvent blended into the polypropylene and extruded (one extrusion) and pelletized. The stabilized resin pellets obtained are spun into fibers at 260° C. and Yellowness Index is determined before exposure to gas fading at 60° C. and after one day exposure. Lower numbers indicate less yellowing and less color. The gas fading procedure is carried out in an AATCC gas fume chamber (Drum Model No. 8727) according to the standard procedure at AATCC Test Method 23, "Colorfastness to Burnt Gas Fumes."

| Additives | Conc. (wt. %) | Gas Fading YI Color (Days) | |
|---|---|---|---|
| | | 0 | 1 |
| Base | — | 5.7 | 25 |
| Example II | 0.25 | 2.7 | 21 |

EXAMPLE XIII

Resistance to Loss Through Volatilization

The higher molecular weight compounds exhibit resistance to loss through volatilization when held at high temperature as is encountered during the processing of polyolefins. This is evidenced by inspection of thermal gravimetric analyzer scans from room temperature to 500° C. at a rate of 10° C./minute, under a flow of 100 ml $N_2$/min. at 80% suppression, which shows that the compound of Example IX would resist loss by volatilization when used as process stabilizer for polyolefin.

| Compound of | Temp. (°C.) at % Weight Loss | | |
|---|---|---|---|
| | 1% | 10% | 50% |
| Example IX | 245 | 280 | 305 |

The data in Examples X–XIII thus illustrate the effective stabilization activity and excellent performance characteristics of substrates containing the instant compounds.

Summarizing, it is seen that this invention provides organic materials stabilized against degradation by the presence therein of various di- and tri-substituted hydroxylamines as well as various novel hydroxylamine derivatives.

Variations may be made in proportions, procedures and materials without departing from the scope of the instant invention as defined by the instant claims.

What is claimed is:

1. A composition of matter comprising a, polymer or lubricating oil subject to oxidative, thermal and actinic degradation stabilized with an effective stabilizing amount of a compound selecting from the group consisting of $\alpha,\alpha'$-bis (benzyloxyamino)-p-xylene and compounds having the formula

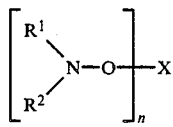

wherein
$R^1$ is hydrogen, alkyl of 1 to 36 carbon atoms, cycloalkyl of 5 to 12 carbon atoms, aralkyl of 7 to 9 carbon atoms or said aralkyl substituted by alkyl of 1 to 36 carbon atoms;
$R^2$ is alkyl of 1 to 36 carbon atoms, cycloalkyl of 5 to 12 carbon atoms, aralkyl of 7 to 9 carbon atoms or said aralkyl substituted by alkyl of 1 to 36 carbon atoms;

n is 1–4;
X, when n is 1, is the same as $R^2$;
X, when n is 2, is alkylene of 2 to 12 carbon atoms, cycloalkylene of 6 to 10 carbon atoms or alkylenearylenealkylene of 8 to 10 carbon atoms;
X, when n is 3, is alkanetriyl of 3 to 6 carbon atoms or

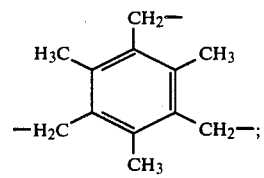

and
X, when n is 4, is alkanetetrayl of 4 to 6 carbon atoms.

2. The composition of claim 1, wherein $R^1$ and $R^2$ in said compound are independently alkyl of 1 to 18 carbon atoms, cycloalkyl of 5 to 6 carbon atoms, benzyl $\alpha$-methylbenzyl or $\alpha,\alpha$-dimethylbenzyl.

3. The composition of claim 2, wherein $R^1$ and $R^2$ are benzyl.

4. The compostion of claim 1, wherein $R^1$ is hydrogen and $R^2$ is alkyl of 1 to 18 carbon atoms, cycloalkyl of 5 to 6 carbon atoms, benzyl, $\alpha$, methylbenzyl or $\alpha,\alpha$-dimethylbenzyl.

5. The composition of claim 1, wherein n is 1.

6. The composition of claim 5, wherein X is alkyl of 1 to 18 carbon atoms, cycloalkyl of 5 to 6 carbon atoms, benzyl,$\alpha$-methylbenzyl or $\alpha,\alpha$-dimethylbenzyl.

7. The composition of claim 1, wherein n is 2.

8. The composition of claim 7, wherein X is alkylene of 2 to 12 carbon atoms, cyclohexylene and xylylene.

9. The composition of claim 5 containing O-methyl-N,N-dibenzylhydroxylamine.

10. The composition of claim 5, containing N,N,O-tribenzylhydroxylamine.

11. The composition of claim 5, containing N,N,O-tris[m-methylbenzyl]hydroxylamine.

12. The composition of claim 5, containing N-dodecyl-O-benzylhydroxylamine.

13. The composition of claim 5, containing N,N-didodecyl-O-benzylhydroxylamine.

14. The composition of claim 5, containing N,O-dibenzylhydroxylamine.

15. The composition of claim 5, containing O-methyl-N-benzylhydroxylamine.

16. The composition of claim 7, containing 1,8-bis[N,N-dibenzylaminoxy]octane.

17. The composition of claim 1, wherein the polymer is a synthetic polymer.

18. The composition of claim 17, wherein the synthetic polymer is a polyolefin monopolymer or copolymer.

19. The composition of claim 18 which also contains a metal salt of a higher fatty acid.

20. The composition of claim 1 which also contains a phenolic antioxidant.

21. The composition of claim 19 which also contains a phenolic antioxidant.

22. The composition of claim 20, wherein said phenolic antioxidant is selected from the group consisting of n-octadecyl 3,5-di-tert-butyl-4-hydroxyhydrocinnamate, neopentanetetrayl tetrakis-(3,5-di-tert-butyl-4-hydroxylhydrocinnamate), di-n-octadecyl 3,5-di-tertbutyl-4-hydroxybenzyl-phosphonate, 1,3,5-tris(3,5-di-tert-butyl-4hydroxy-benzyl)isocyanurate, thiodiethylene bis(3,5-di-tert-butyl-4-hydroxyhydrocinnamate), 1,3,5-trimethyl-2,4,6-tris(3,5-di-tert-butyl-4-hydroxybenzyl)benzene, 3,6-di-oxaocta-methylene bis(3-methyl-5-tert-butyl-4-hydroxyhydro-cinnamate), 2,6-di-tert-butyl-p-cresol, 2,2'-ethylidene-bis(4,6-di-tert-butylphenol), 1,3,5-tris(2,6-di-methyl-4-tert-butyl-3-hydroxybenzyl)isocyanurate, 1,1,3-tris-(2-methyl-4-hydroxy-5-tert-butylphenyl)butane, 1,3,5-tris-[2-(3,5-di-tert-butyl-4-hydroxyhydro-cinnamoyl-oxy)-ethyl]-isocyanurate, 3,5-di-(3,5-di-tert-butyl-4-hydroxybenzyl)-mesitol, hexa-methylene bis(3,5-di-tert-butyl-4-hydroxyhydrocinnamate), 1-(3,5-di-tert-butyl-4-hydroxyanilino)-3,5-di(octylthio)-s-triazine, N,N'-hexamethylene-bis(3,5-di-tert-butyl-4-hydroxyhydrocinnamamide), calcium bis(ethyl 3,5-di-tert-butyl-4-hydroxybenzylphosphonate), ethylene bis[3,3-di(3-tert-butyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)-hydrazide, and N,N'-bis[2-(3,5-tert-butyl-4-hydroxyhydroxo-cinnamoyloxy)ethyl]oxamide.

23. The composition of claim 22, wherein said phonolic antioxidant is neopentanetetrayl tetrakis(3,5-di-tert-butyl-4-hydroxyhydrocinnamate), n-octadecyl 3,5-di-tert-butyl-4-hydroxyhydrocinnamate, 1,3,5-trimethyl-2,4,6-tris(3,5-tert-butyl-4-hydroxybenzylbenzene, 1,3,5-tris(3,5-di-tert-butyl-4-hydroxybenzyl)isocyanurate, 2,6-di-tert-butyl-p-cresol or 2,2'-ethylidene-bis(4,6-di-tert-butylphenol).

24. A method for stabilizing a polymer or lubricating oil against oxidative, thermal and actinic degradation which comprises incorporating into said organic material an effective stabilizing amount of a compound of claim 1.

25. A compound of the formula

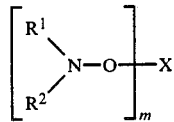

wherein
m is 2–4;

$R^1$ is hydrogen, alkyl of 1 to 36 carbon atoms, cycloalkyl of 5 to 12 carbon atoms, aralkyl of 7 to 9 carbon atoms or said aralkyl substituted by alkyl of 1 to 36 carbon atoms;

$R^2$ is alkyl of 1 to 36 carbon atoms, cycloalkyl of 5 to 12 carbon atoms, aralkyl of 7 to 9 carbon atoms or said aralkyl substituted by alkyl of 1 to 36 carbon atoms;

at least one of $R^1$ and $R^2$ being said aralkyl or said substituted aralkyl when m is 2;

X, when m is 2, is alkylene of 2 to carbon atoms, cycloalkylene of 6 to 10 carbon atoms or alkylenearylenealkylene of 8 to 10 carbon atoms;

X, when m is 3, is alkanetriyl of 3 to 6 carbon atoms or

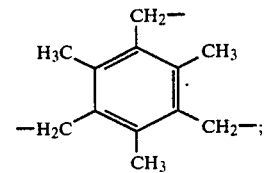

and X, when m is 4, is alkanetetrayl of 4 to 6 carbon atoms.

26. The compound of claim 25, wherein $R^1$ and $R^2$ are independently alkyl of 1 to 18 carbon atoms, cycloalkyl of 5 to 6 carbon atoms, benzyl, α-methylbenzyl or α,α-dimethylbenzyl, with at least one of $R^1$ and $R^2$ being benzyl, α-methylbenzyl or α,α-dimethylbenzyl when m is 2.

27. The compound of claim 26, wherein m is 2.

28. The compound of claim 27, wherein X is alkylene of 2 to 12 carbon atoms, cyclohexylene or xylylene.

29. The compound of claim 26, wherein $R^1$ and $R^2$ are benzyl.

30. The compound of claim 25, wherein $R^1$ is hydrogen and $R^2$ is alkyl of 1 to 18 carbon atoms, cycloalkyl of 5 to 6 carbon atoms, benzyl, α-methylbenzyl or α,α-dimethylbenzyl, with $R^2$ being benzyl, α-methylbenzyl or α,α-dimethylbenzyl when m is 2.

31. 1,8-Bis[N,N-dibenzylaminoxy]octane according to claim 27.

32. α,α'-bis[benzyloxyamino]-p-xylene.

* * * * *